United States Patent
Fontanella et al.

[11] 3,920,660
[45] Nov. 18, 1975

[54] TETRAHYDROPYRROLO[1,2-A]PYRAZINE-1(2H),4(3H)-DIONES

[75] Inventors: Luigi Fontanella; Luigi Mariani, both of Milan, Italy

[73] Assignee: Gruppo Lepetit S.p.A., Milan, Italy

[22] Filed: Oct. 19, 1973

[21] Appl. No.: 408,243

[30] Foreign Application Priority Data
Nov. 3, 1972   Italy.................................. 31276/72

[52] U.S. Cl................250/250 BC; 260/247.2 A;
260/268 BC; 260/326.2; 260/326.46;
424/248; 424/250
[51] Int. Cl.²....................................... C07D 241/00
[58] Field of Search...260/250 BC, 268 BC, 247.7 R, 260/247.2 A

[56] References Cited
UNITED STATES PATENTS

| | | | |
|---|---|---|---|
| 3,176,017 | 3/1965 | Freed | 260/268 BC |
| 3,503,980 | 3/1970 | Rossi | 260/268 BC |
| 3,563,992 | 2/1971 | Harnden | 260/268 BC |

OTHER PUBLICATIONS
Lucente, et al. Chemical Abstract 75: 64266x (1971).

*Primary Examiner*—Richard J. Gallagher
*Attorney, Agent, or Firm*—Theodore Post; C. Kenneth Bjork

[57] ABSTRACT

6,7,8,8a-Tetrahydropyrrolo[1,2-a]pyrazine-1(2H)-4(3H)-diones of the formula

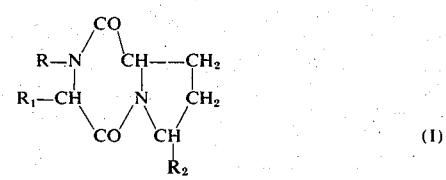

where R is hydrogen, lower alkyl, a phenyl or a benzyl radical, $R_1$ is hydrogen or a lower alkyl radical, $R_2$ is (a) a $COR_3$ radical where $R_3$ is selected from the group hydroxy, lower alkoxy, mono- and di-lower alkylamino-lower alkoxy, amino, mono- and di-lower alkylamino, mono- and di-lower alkylamino-lower alkylamino, a phenylamino, hydroxyamino, a morpholine, pyrrolidine, piperidine, and piperazine ring which ring may also have 1 or 2 lower alkyl substituents; (b) a $CH_2R_4$ radical where $R_4$ is selected from the group hydroxy, carboxy, carbo(lower alkoxy), lower acyloxy and carbamyloxy. The compounds of the invention are useful as C.N.S. depressants and in particular as tranquilizing agents.

3 Claims, No Drawings

TETRAHYDROPYRROLO[1,2-A]PYRAZINE-1(2H),4(3H)-DIONES

SUMMARY OF THE INVENTION

This invention relates to new 6,7,8,8a-tetrahydropyrrolo[1,2-a]pyrazine-1(2H),4(3H)-diones represented by the formula

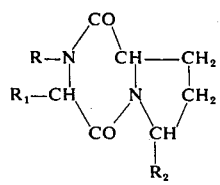

(I)

wherein R represents a hydrogen, lower alkyl, a phenyl or a benzyl radical, $R_1$ represents a hydrogen or lower alkyl radical, $R_2$ represents (a) a $COR_3$ radical wherein $R_3$ is selected from the group of hydroxy, lower alkoxy, mono-and di-lower alkylamino-lower alkoxy, amino, mono- and di-lower alkyl amino, mono- and di-lower alkylamino-lower alkylamino, a phenylamino, hydroxyamino, a morpholine, pyrrolidine, piperidine and piperazine ring which ring may have 1 or 2 lower alkyl substituents; (b) a $CH_2R_4$ radical wherein $R_4$ is selected from the group hydroxy, carboxy, carbo(lower alkoxy), lower acyloxy and carbamyloxy.

In the specification and claims, the following terms by themselves and in compound terms have the following meanings: "lower alkyl" and "lower alkoxy" designate alkyl and alkoxy groups containing from 1 to 4 carbon atoms; "lower acyloxy" designates an acyloxy group containing from 1 to 4 carbon atoms; "a phenyl" designates phenyl or substituted phenyl having up to 2 substituents selected from lower alkyl, lower alkoxy, fluoro, chloro and bromo; "a benzyl" designates benzyl or substituted benzyl having up to 2 substituents selected from lower alkyl, lower alkoxy, fluoro, chloro and bromo; "a morpholine, a pyrrolidine, a piperidine and a piperazine radical" designates one of the unsubstituted heterocyclic rings or one having up to two lower alkyl substituent groups.

The compounds of this invention from which the whole series of inventive compounds is derived are those of formula (I) wherein $R_2$ represents a $COR_3$ radical wherein $R_3$ represents lower alkoxy. The ester function may then be easily converted to carboxy, carbamyl and all of the other substituents mentioned before. A preferred embodiment of the invention comprises those lower alkyl esters which are obtained through the following reaction scheme, wherein R and $R_1$ have the same meanings as given above and the term "halo" refers to bromo or chloro:

Scheme 1

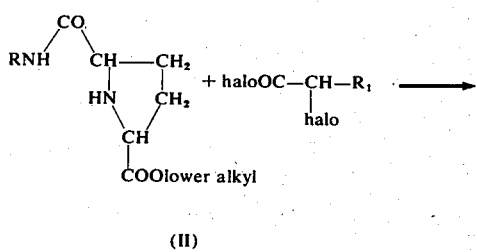

(II)

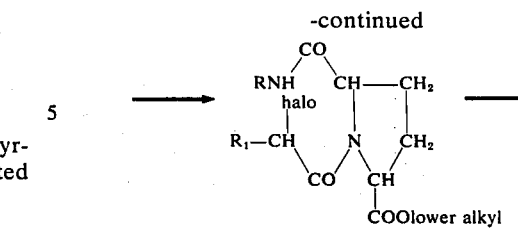

(III)

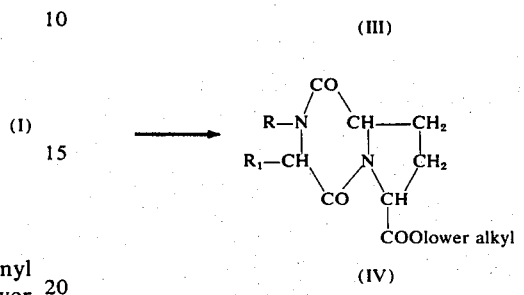

(IV)

The starting 2-carbamyl-5-carbo(lower alkoxy)pyrrolidine derivatives of formula (II) may be prepared as described by G. Cignarella et al. in Gazz. Chim. Italiana, 92, 1093, (1962) by heating, for example, 2,5-dicarbethoxy-pyrrolidine with about one equimolecular proportion of an indicated amine in a high boiling inert organic solvent. In some instances, the two reactants may be heated together without any solvent for 3–40 hours at a temperature varying from about 150° to about 250°C. The 2-carbamyl-5-carbo-(lower alkoxy)pyrrolidine derivatives are generally obtained as cis- and trans- isomeric mixtures. The intermediates of formula (III) are prepared by reacting compounds of formula (II) with an α-halo-acyl halide in an inert organic solvent such as, for example, diethyl ether, in the presence of an acid acceptor such as, for example, triethylamine. The last intramolecular cyclization step is carried out by heating the compounds of formula (III) in the presence of a strong base such as, for example, sodium amide. The reaction temperature may vary from about 20° to about 100°C., and the time of the reaction may range from about 1 to about 20–30 hours.

Another procedure for preparing the esters is based on the following steps:

Scheme 2

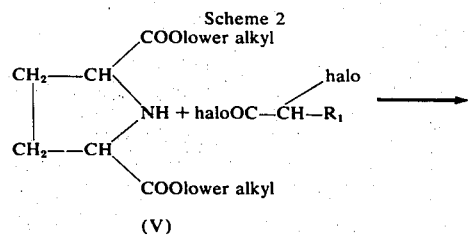

(V)

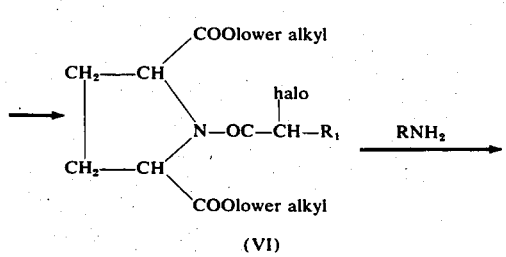

(VI)

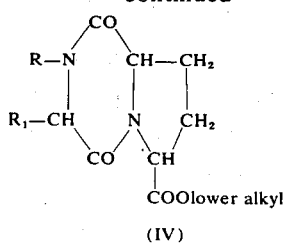

(IV)

wherein halo, R and $R_1$ have the same meaning as given before. The reaction between a 2,5-dicarbo(lower alkoxy)-pyrrolidine and an α-halo-acylhalide is carried out essentially under the same conditions as for the preparation of the intermediate (III) of the process described in Scheme 1. The second step of Scheme 2 is carried out by refluxing for 5–25 hours the intermediate diester (VI) together with an indicated amine in the presence of an acid acceptor. Toluene, xylene and other inert organic solvents are advantageously used as the reaction solvents and triethylamine, sodium amide or an excess of the same amine, $RNH_2$, may be used as acid acceptors. To complete the cyclization reaction, in some instances the oily residue obtained after evaporation of the organic solvent is heated for 1–5 hours at 150°–260°C. The esters of formula (IV) may be converted through alkaline hydrolysis to the corresponding acids which in turn are converted to the amide by treatment with ethyl chlorocarbonate in the presence of triethylamine followed by reaction with an indicated amine. The latter procedure may also be followed to obtain esters from the corresponding acids if an alcohol is employed instead of an amine. An alternative method for preparing amides or esters from the corresponding acid derivatives consists in the transformation of the acid function to a carbonyl halide with a halogenating reagent such as $SOCl_2$, $PCl_5$, $POCl_3$ and the like, followed by reaction with an amine or an alcohol. The indicated carbonyl halides are also suitable intermediates for obtaining compounds of formula (I) wherein $R_2$ represents hydroxymethyl. In this case the reduction reaction is advantageously carried out by employing an alkali metal borohydride, advantageously sodium borohydride, as reducing agent. The so-obtained hydroxymethyl derivatives are easily transformed to acyloxymethyl compounds with an acylating agent. The compounds of formula (I) wherein R is carbo(lower alkoxy)-methyl, i.e., $-CH_2-COO$lower alkyl, are prepared from the corresponding compounds of formula (I) where R is a carboxy group via the Arndt-Eistert method. The resulting ester group may subsequently be transformed to the acid group by alkaline hydrolysis.

The compounds of formula (I) wherein $R_1$ is a lower alkyl radical possess three asymmetric centers, i.e., the carbon atoms in positions 3, 6 and 8a, and, therefore, eight stereoisomers are theoretically possible. When $R_1$ is hydrogen, the possible stereoisomers are four. Fractional crystallization and chromatographic techniques are useful for separating the racemates which, in turn, are mixtures of optical isomers (enantiomers). Resolution of racemic mixtures into their optical isomers may be effected after introduction of a new optically active center. Thus, for instance, in the case of acidic components, salts with optically active bases or esterification with optically active alcohols allows separation of the two components. The salts or the esters may subsequently be reconverted to the original free acid derivatives.

The additional examples and descriptions of utility provide in detail methods for the manufacture of representative compounds of the invention and their usefulness. The symbols α and β are used to identify two different isomers when they are separated from the reaction mixture. The compounds of the α series are derived from the isomeric forms of the esters of formula (IV) which are first eluted during the separation by column chromatography.

EXAMPLE 1:

3-Methyl-2-(p-tolyl)-6,7,8,8a-tetrahydro-1-(2H), 4(3H)-dioxopyrrolo[1,2-a]pyrazine-6-carboxylic acid ethyl ester (α-isomer)

A sodium amide suspension is prepared by dissolving 1.5 g. of sodium in an excess (750 ml.) of liquid $NH_3$ in the presence of a crystal of $Fe(NO_3)_3$ and stirring the mixture to a complete formation of sodium amide. To this suspension, 25.5 g. of 1-(2-bromopropionyl)-5-(p-tolylcarbamyl)-pyrrolidine-2-carboxylic acid ethyl ester are added in small portions at about −40°C. under stirring. To this mixture, 750 ml. of anhydrous diethyl ether is added and stirring is continued to complete evaporation of the excess ammonia. The mixture is then refluxed for 3 hours. After cooling, water is added to complete dissolution of the inorganic salts and the organic layer is dried and evaporated, yielding 15.7 g. of the title compound, which melts at 159°–161°C. after crystallization from ethanol.

EXAMPLE 2:

2-Benzyl-3-ethyl-6,7,8,8a-tetrahydro-1(2H),-4(3H)-dioxopyrrolo[1,2-a]pyrazine-6-carboxylic acid ethyl ester (α-isomer and β-isomer)

A sodium amide suspension is prepared by dissolving 3.5 g. of sodium in an excess (1500 ml.) of liquid $NH_3$. To the amide suspension at about −40°C., 63 g. of 5-benzylcarbamyl-1-(2-bromobutyryl)pyrrolidine-2-carboxylic acid ethyl ester is added in small portions under stirring. Then 1000 ml. of anhydrous diethyl ether is added and stirring is continued to complete evaporation of the excess ammonia. The mixture is then refluxed for about 3 hours and after cooling is washed with water to dissolve the inorganic salts. The organic layer is separated, dried and evaporated to give 48 g. of an oily residue which is dissolved in benzene and chromatographed through a silica-gel column by using benzol:diethyl ether 8:2 as the eluent. The first fractions which contain some impurities are discarded while the intermediate fractions after evaporation give 32 g. of the α-isomer boiling at 210°C./0.5 mm Hg. and the last fractions give 4.4 g. of the β-isomer melting at 135°–139° C. after crystallization from diisopropyl ether.

EXAMPLE 3:

3-Methyl-6,7,8,8a-tetrahydro-1(2H),4(3H)-dioxapyrrolo[1,2-a]pyrazine-6-carboxylic acid ethyl ester To a sodium amide suspension prepared from 0.50 g. of sodium and an excess of liquid ammonia (500 ml.), 51.3 g. of 1-(2-bromopropionyl)-2,5-dicarbethoxypyrrolidine is added in small portions and the mixture is stirred to complete evaporation of the excess $NH_3$. Then 300 ml. of diethyl ether is added and the mixture is refluxed for about 1 hour. After cooling, the precipitated solid is taken up with chloroform and the insoluble impurities are separated by filtration. Upon evaporation of the chloroform solution, 20 g. of the title compound is obtained which melts at 182°–184°C.

EXAMPLE 4:

3-Methyl-2-(p-tolyl)-6,7,8,8a-tetrahydro-1(2H),4(3H)-dioxopyrrolo[1,2-a]pyrazine-6-carboxylic acid ethyl ester (α-isomer and β-isomer)

To a solution of 70 g. 1-(2-bromopropionyl)-2,5-dicarbethoxypyrrolidine in 650 ml. of toluene, 24 g. of p-toluidine and 24 g. of triethylamine are added and, after introduction of a catalytic amount of sodium (0.1 g.), the mixture is refluxed for 18 hours. After cooling, the triethylamine hydrobromide is filtered off and the solvent is evaporated. The oily residue is then heated under a nitrogen atmosphere at 240°–250°C. The reaction is followed by collecting ethanol which forms during the cyclization process and heating is stopped when the distillate becomes strongly alkaline. The oily product is then taken up with chloroform and the solution is washed subsequently with water and aqueous sodium bicarbonate. After evaporation of the chloroform solution, the residue is dissolved in diethyl ether and is allowed to stand overnight in a refrigerator. The solid which precipitates is recovered by filtration, yielding 20 g. of the α-isomer, m.p. 159°–160°C. The oily residue obtained by evaporation of the filtrate is dissolved in benzene and chromatographed through a silica gel column and eluting with benzene:ethyl acetate 95:5. Evaporation of the first 40 fractions (each of about 200 ml.) gives small amounts of by-products and of the α-isomer, while evaporation of the subsequent 40 fractions gives 5.2 g. of the β-isomer which is purified by trituration with a mixture of diisopropyl ether and diethyl ether 50:50; m.p. 100°–102°C.

EXAMPLE 5:

3-Ethyl-2-(p-methoxyphenyl)-6,7,8,8a-tetrahydro-(2H),4(3H)-dioxopyrrolo[1,2-a]pyrazine-6-carboxylic acid ethyl ester Eighteen grams of 1-(2-bromobutyryl)-2,5-dicarbethoxypyrrolidine is refluxed for 6 hours with 15 g. of p-methoxyaniline in 150 ml. of anhydrous toluene. After cooling, the p-methoxyaniline hydrobromide is filtered off and the filtrate is evaporated to dryness. The oily residue is dissolved in diethyl ether and the organic solution is washed with water and then evaporated. The residue is heated for 1 hour at 160°C. and then for another hour at 200°C. The title product is recovered by distilling at 240°C./0.6 mm Hg.; yield 13 g.

EXAMPLE 6:

2-(p-Chlorophenyl)-3-ethyl-6,7,8,8a-tetrahydro-(2H),4(3H)-dioxopyrrolo[1,2-a]pyrazine-6-carboxylic acid ethyl ester The compound is prepared according to the procedure of Example 5 from 1-(2-bromobutyryl)-2,5-dicarbethoxy-pyrrolidine and p-chloroaniline; b.p. 225°–230°C./0.6 mm Hg.

EXAMPLE 7

3-Ethyl-2-(p-methylbenzyl)-6,7,8,8a-tetrahydro-(2H),4(3H)-dioxopyrrolo[1,2-a]pyrazine-6-carboxylic acid ethyl ester A mixture of 1-(2-bromobutyryl)-2,5-dicarbethoxy-pyrrolidine (9.2 g) and p-methylbenzylamine (7 g.) in 80 ml. of anhydrous toluene are refluxed together for 6 hours. After cooling, the by-product p-methylbenzylamine hydrobromide is filtered off and the solution is evaporated to dryness. The oily residue is dissolved in diethyl ether, and the solution is washed with water. The organic phase is dried and then evaporated. The title compound, is recovered by distilling at 225°–230°C./0.5 mm Hg.; yield 7 g.

EXAMPLES 8–35:

By reacting the indicated pyrrolidine in following column A of the Table below with the indicated amine in column B according to the method of Example 7, the end compounds in column C are obtained. The separation into the isomeric α and β forms is carried out according to the procedures outlined in Examples 2 and 4.

TABLE

| Ex. No. | -2,5-dicarbethoxypyrrolidine | amine | 6,7,8,8a-tetrahydro-1(2H),4(3H)-dioxopyrrolo[1,2-a]pyrazine-6-carboxylic acid ethyl ester | M.P. °C. or B.P. C./mm Hg. |
|---|---|---|---|---|
| 8 | 1-(2-bromopropionyl)- | benzylamine | 2-benzyl-3-methyl- | 220–230/0.6 |
| 9 | 1-(2-bromobutyryl)- | p-chlorobenzylamine | 2-(p-chlorobenzyl)-3-ethyl | 230/0.5 |
| 10 | 1-(2-bromohexanoyl)- | p-chlorobenzylamine | 3-butyl-3-(p-chlorobenzyl)- | 250/0.6 |
| 11 | 1-(2-bromo-3-methylbutyryl)- | p-chlorobenzylamine | 2-(p-chlorobenzyl)-3-isopropyl | 220/0.4 |
| 12 | 1-(2-bromo-3-methylbutyryl) | p-methoxybenzylamine | 3-isopropyl-2-(p-methoxybenzyl) | 240/0.5 |
| 13 | 1-(2-bromohexanoyl)- | p-methoxybenzylamine | 3-butyl-2-(p-methoxybenzyl)- | 240/0.4 |
| 14 | 1-(2-bromobutyryl)- | p-methoxybenzylamine | 3-ethyl-2-(p-methoxybenzyl)- | 240/0.4 |
| 15 | 1-(2-bromo-4-methylvaleryl)- | p-chlorobenzylamine | 2-(p-chlorobenzyl)-3-isobutyl | 235/0.5 |
| 16 | 1-(2-bromo-4-methylvaleryl)- | benzylamine | 2-benzyl-3-isobutyl | 230–235/0.5 |
| 17 | 1-(2-bromo-4-methylvaleryl)- | p-methoxybenzylamine | 3-isobutyl-2-(p-methoxybenzyl)- | 240/0.5 |
| 18 | 1-(2-bromo-3-methylbutyryl)- | p-methylbenzylamine | 3-isopropyl-2-(p-methylbenzyl)- | 220/0.5 |
| 19 | 1-(2-bromo-4-methylvaleryl)- | p-methylbenzylamine | 3-isobutyl-2-(p-methylbenzyl)- | 220–225/0.5 |
| 20 | 1-(2-bromohexanoyl)- | 3,4-dimethylbenzylamine | 3-butyl-2-(3,4-dimethylbenzyl)- | 245–250/0.5 |
| 21 | 1-(2-bromohexanoyl)- | p-methylbenzylamine | 3-butyl-2-(p-methylbenzyl)- | 230/0.4 |
| 22 | 1-(2-bromohexanoyl)- | benzylamine | 2-benzyl-3-butyl- | 215–230/0.3 |
| 23 | 1-(2-bromohexanoyl)- | 3,4-dimethylbenzylamine | 3-ethyl-3-(3,4-dimethylbenzyl)- | 240–250/0.6 |
| 24 | 1-(2-bromo-3-methylbutyryl)- | benzylamine | 2-benzyl-3-isopropyl- | 210–215/0.5 |
| 25 | 1-(2-bromopropionyl)- | o-anisidine | α-3-methyl-2-(o-anisyl)- | 134–136 |
| 26 | 1-(2-bromopropionyl)- | o-anisidine | β-3-methyl-2-(o-anisyl)- | 220–230/0.6 |
| 27 | 1-(2-bromopropionyl)- | p-anisidine | α-3-methyl-2-(p-anisyl)- | 140–142 |
| 28 | 1-(2-bromopropionyl)- | p-anisidine | β-3-methyl-2-(p-anisyl)- | 134–135 |
| 29 | 1-(2-bromopropionyl)- | o-chloroaniline | α-3-methyl-2-(o-chlorophenyl)- | 137–138 |
| 30 | 1-(2-bromopropionyl)- | o-chloroaniline | β-3-methyl-2-(o-chlorophenyl)- | 108 |
| 31 | 1-(2-bromopropionyl)- | p-chloroaniline | 3-methyl-2-(p-chlorophenyl)- | 144 |

TABLE-continued

| Ex. No. | -2,5-dicarbethoxypyrrolidine | amine | 6,7,8,8a-tetrahydro-1(2H),4(3H)-dioxopyrrolo[1,2-a]pyrazine-6-carboxylic acid ethyl ester | M.P.°C. or B.P. C./mm Hg. |
|---|---|---|---|---|
| 32 | 1-(2-bromopropionyl)- | m-anisidine | 3-methyl-2-(m-anisyl)- | 116–118 |
| 33 | 1-(2-bromopropionyl)- | m-toluidine | 3-methyl-2-(m-tolyl)- | 98–100 |
| 34 | 1-(2-bromopropionyl)- | m-chloroaniline | 3-methyl-2-(m-chlorophenyl)- | 136–138 |
| 35 | 1-(2-chloroacetyl)- | p-toluidine | (2-p-tolyl)- | 139 |

EXAMPLE 36:

3-methyl-2-(p-tolyl)-6,7,8,8a-tetrahydro-1-(2H), 4(3H)-dioxopyrrolo[1,2-a]pyrazine-6-carboxylic acid (α-isomer)

To 8.8 g. of the α-isomer of 3-methyl-2-(p-tolyl)-6,7,8,8a-tetrahydro-1(2H),4(3H)-dioxapyrrolo[1,2-a]pyrazine-6-carboxylic acid diethyl ester in 50 ml. of ethanol, 41 ml. of 1 N sodium hydroxide is added and the mixture is allowed to stand for 2 hours at room temperature. Ethanol is evaporated in vacuo and the residue is taken up with water and extracted with diethyl ether. The aqueous phase is acidified with dilute mineral acid and the titular product as a solid precipitate is recovered by filtration; yield 7.5 g., m.p. 153°–156°C.

EXAMPLES 37–75:

Pursuant to the procedure of Example 36, the following acids are prepared starting from the corresponding ethyl esters:

37. 3-Methyl-2-(p-tolyl)-6,7,8,8a-tetrahydro-1(2H),4(3H)-dioxopyrrolo[1,2-a]pyrazine-6-carboxylic acid (β-isomer), m.p. 137°–139°C.
38. 3-Methyl-6,7,8,8a-tetrahydro-0b 1(2H),4(3H)-dioxopyrrolo[1,2-a]pyrazine-6-carboxylic acid (β-isomer), m.p. 238°–242°C.
39. 2-Benzyl-3-butyl-6,7,8,8a-tetrahydro-1(2H),4(3H)-dioxopyrrolo[1,2-a]pyrazine-6-carboxylic acid (β-isomer), m.p. 144°–146°C.
40. 3-Butyl-2-(3,4-dimethylbenzyl)-6,7,8,8a-tetrahydro-1(2H),4(3H)-dioxopyrrolo[1,2-a]pyrazine-6-carboxylic acid (β-isomer), m.p. 110°–115°C.
41. 3-Butyl-2-(p-tolyl)-6,7,8,8a-tetrahydro-1(2H),4(3H)-dioxopyrrolo[1,2-a]pyrazine-6-carboxylic acid (β-isomer), m.p. 75°–80°C.
42. 2-Benzyl-3-isobutyl-6,7,8,8a-tetrahydro-1(2H),4(3H)-dioxopyrrolo[1,2-a]pyrazine-6-carboxylic acid (β-isomer), m.p. 159°–160°C.
43. 3-Isobutyl-2-(p-tolyl)-6,7,8,8a-tetrahydro-1(2H),-4(3H)-dioxopyrrolo[1,2-a]pyrazine-6-carboxylic acid (β-isomer), m.p. 155°–165°C.
44. 3-Isobutyl-2-(p-methoxybenzyl)-6,7,8,8a-tetrahydro-1(2H),4(3H)-dioxopyrrolo[1,2-a]pyrazine-6-carboxylic acid (β-isomer), m.p. 148°–151°C.
45. 3-Butyl-2-(p-chlorobenzyl)-6,7,8,8a-tetrahydro-1(2H),-4(3H)-dioxopyrrolo[1,2-a]pyrazine-6-carboxylic acid (β-isomer), m.p. 159°–161°C.
46. 3-Ethyl-2-(p-methoxybenzyl)-6,7,8,8a-tetrahydro-1(2H),4(3H)-dioxopyrrolo[1,2-a]pyrazine-6-carboxylic acid (β-isomer), m.p. 172°–175°C.
47. 2-(p-Chlorobenzyl)-3-isobutyl-6,7,8,8a-tetrahydro-1(2H),4(3H)-dioxopyrrolo[1,2-a]pyrazine-6-carboxylic acid (β-isomer), m.p. 200°–203°C.
48. 3-Isopropyl-2-(p-tolyl)-6,7,8,8a-tetrahydro-1(2H),-4(3H)-dioxopyrrolo[1,2-a]pyrazine-6-carboxylic acid (β-isomer), m.p. 203°–204°C.
49. 2-(p-Chlorobenzyl)-3-isopropyl-6,7,8,8a-tetrahydro-1(2H),4(3H)-dioxopyrrolo[1,2-a]pyrazine-6-carboxylic acid (β-isomer), m.p. 143°–147°C.
50. 3-Isopropyl-2-(p-methoxybenzyl)-6,7,8,8a-tetrahydro-(2H),4(3H)-dioxopyrrolo[1,2-a]pyrazine-6-carboxylic acid (β-isomer), m.p. 146°–148°C.
51. 1-(p-Chlorobenzyl)-3-ethyl-6,7,8,8a-tetrahydro-(2H),4(3H)-dioxopyrrolo[1,2-a]pyrazine-6-carboxylic acid (β-isomer), m.p. 210°–213°C.
52. 2-Benzyl-3-isopropyl-6,7,8,8a-tetrahydro-1(2H),4(3H)-dioxopyrrolo[1,2-a]pyrazine-6-carboxylic acid (β-isomer), m.p. 145°–148°C.
53. 3-Butyl-2-(p-methoxybenzyl)-6,7,8,8a-tetrahydro-1(2H),-4(3H)-dioxopyrrolo[1,2-a]pyrazine-6-carboxylic acid (β-isomer), (oily).
54. 2-Benzyl-3-ethyl-6,7,8,8a-tetrahydro-1(2H),4(3H)-dioxopyrrolo[1,2-a]pyrazine-6-acetic acid (oily).
55. 2-Benzyl-3-butyl-6,7,8,8a-tetrahydro-1(2H),4(3H)-dioxopyrrolo[1,2-a]pyrazine-6-acetic acid, m.p. 161°–164°C.
56. 3-Butyl-2(3,4-dimethylbenzyl)-6,7,8,8a-tetrahy-(2H),4(3H)-dioxopyrrolo[1,2-a]pyrazine-6-acetic acid, m.p. 68°–70°C.
57. 2-Benzyl-3-ethyl-6,7,8,8a-tetrahydro-1(2H),4(3H)-dioxopyrrolo[1,2-a]pyrazine-6-carboxylic acid (α-isomer), m.p. 158°–161°C.
58. 2-Benzyl-3-ethyl-6,7,8,8a-tetrahydro-1(2H),4(3H)-dioxopyrrolo [1,2-a]pyrazine-6-carboxylic acid (β-isomer), m.p. 180°–182°C.
59. 2-(p-Anisyl)-3-methyl-6,7,8,8a-tetrahydro-1(2H),4(3H)-dioxopyrrolo[1,2-a]pyrazine-6-carboxylic acid (α-isomer), m.p. 203°C.
60. 2-(p-Anisyl)-3-methyl-6,7,8,8a-tetrahydro-1(2H),4(3H)-dioxopyrrolo [1,2-a]pyrazine-6-carboxylic acid (β-isomer), m.p. 111°–114°C.
61. 2-(p-Tolyl)-6,7,8,8a-tetrahydro-1(2H),4(3H)-dioxopyrrolo[1,2-a]pyrazine-6-carboxylic acid (α-isomer), m.p. 230°–232°C.
62. 2-(p-Tolyl)-6,7,8,8a-tetrahydro-1(2H),4(3H)-dioxopyrrolo[1,2-a]pyrazine-6-carboxylic acid (β-isomer), m.p. 127°C.

63. 2-(m-Anisyl)-3-methyl-6,7,8,8a-tetrahydro-1(2H),-4(3H)-dioxopyrrolo[1,2-a]pyrazine-6-carboxylic acid, m.p. 113°–115°C.
64. 2-(o-Chlorophenyl)-3-methyl-6,7,8,8a-tetrahydro-1(2H),-4(3H)-dioxopyrrolo[1,2-a]pyrazine-6-carboxylic acid (α-isomer), m.p. 196°–199°C.
65. 2-(o-Chlorophenyl)-3-methyl-6,7,8,8a-tetrahydro-1(2H),-4(3H)-dioxopyrrolo[1,2-a]pyrazine-6-carboxylic acid (β-isomer), m.p. 140°C.
66. 3-Methyl-2-(m-tolyl)-6,7,8,8a-tetrahydro-1(2H),4(3H)-dioxopyrrolo[1,2-a]pyrazine-6-carboxylic acid (α-isomer), m.p. 191°–192°C.
67. 3-Methyl-2-(m-tolyl)-6,7,8,8a-tetrahydro-1(2H),4(3H)-dioxopyrrolo[1,2-a]pyrazine-6-carboxylic acid (β-isomer), m.p. 187°–188°C.
68. 3-Methyl-2-(o-toly)-6,7,8,8a-tetrahydro-1(2H),4(3H), dioxopyrrolo[1,2-a]pyrazine-6-carboxylic acid (α-isomer), m.p. 235°–236°C.
69. 3-Methyl-2-(o-tolyl)-6,7,8,8a-tetrahydro-1(2H),4-(3H)-dioxopyrrolo[1,2-a]pyrazine-6-carboxylic acid (β-isomer), m.p. 180°–183°C.
70. 2-(o-Anisyl)-3-methyl-6,7,8,8a-tetrahydro-1(2H),-4(3H)-dioxopyrrolo[1,2-a]pyrazine-6-carboxylic acid (α-isomer), m.p. 99°–100°C.
71. 2-(o-Anisyl)-3-methyl-6,7,8,8a-tetrahydro-1(2H),4-(3H)-dioxopyrrolo[1,2-a]pyrazine-6-carboxylic acid (β-isomer), m.p. 103°–105°C.
72. 2-(m-Chlorophenyl)-3-methyl-6,7,8,8a-tetrahydro-1(2H),-4(3H)-dioxopyrrolo[1,2-a]pyrazine-6-carboxylic acid (α-isomer), m.p. 199°–200°C.
73. 2-(m-Chlorophenyl)-3-methyl-6,7,8,8a-tetrahy-(2H),4(3H)-dioxopyrrolo[1,2-a]pyrazine-6-carboxylic acid (β-isomer), m.p. 183°–185°C.
74. 2-(p-Chlorophenyl)-3-methyl-6,7,8,8a-tetrahydro-1(2H),-4(3H)-dioxopyrrolo[1,2-a]pyrazine-6-carboxylic acid (α-isomer), m.p. 195°–196°C.
75. 2-(p-Chlorophenyl)-3-methyl-6,7,8,8a-tetrahydro-1(2H),-4(3H)-dioxopyrrolo[1,2-a]pyrazine-6-carboxylic acid (β-isomer), m.p. 160°–161°C.

EXAMPLE 76:

2,3-Dibutyl-6,7,8,8a-tetrahydro-1(2H),4(3H)-dioxopyrrolo[1,2-a]pyrazine-6-carboxylic acid The corresponding ethyl ester is obtained in a 72% yield, pursuant to the procedure of Example 1, but using as the starting material 1-(2-bromohexanoyl)-5-butylcarbamyl-pyrrolidine-2-carboxylic acid ethyl ester. The crude ester is hydrolyzed with 1 N potassium hydroxide in ethanol solution. The title compound so obtained melts at 163°–166°C.

EXAMPLE 77:

2-Benzyl-N,N,3-triethyl-6,7,8,8a-tetrahydro-1(2H),4(3H)-dioxopyrrolo[1,2-a]pyrazine-6-carboxamide To a solution of 4.8 g. of 2-benzyl-3-ethyl-6,7,8,8a-tetrahydro-(2H),4(3H)-dioxopyrrolo[1,2-a]pyrazine-6-carboxylic acid and 2.3 g. of triethylamine in 150 ml. of chloroform, 15 ml. of ethyl chlorocarbonate in 10 ml. of chloroform are added at 0°C. After stirring for 20 minutes, 1.3 ml. of diethylamine in 10 ml. of chloroform is added. The mixture is refluxed for 15 minutes and after cooling the organic solution is washed with water. Evaporation of the chloroform gives a residue which is triturated with diisopropyl ether to give the titular product, yield 3.5 g., m.p. 160°–163°C.

EXAMPLES 78–89:

Pursuant to the method described in the previous example and by starting with the corresponding 6-carboxylic acid and the amine or alcohol indicated in column (A) of the Table below, the following amide compounds are prepared:

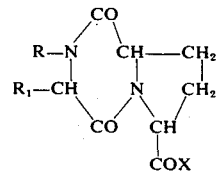

| Ex. | R | R₁ | X | A | M.P.°C. or B.P.°C./mm Hg. |
|---|---|---|---|---|---|
| 78 | p-tolyl | methyl | —N(C₂H₅)₂ | NH(C₂H₅)₂ | 125–129 |
| 79 | p-tolyl | methyl | —NH—C₆H₄—Cl(3) | NH₂—C₆H₄—Cl(3) | 188–189 |
| 80 | butyl | butyl | —N(C₂H₅)₂ | NH(C₂H₅)₂ | 75–78 |
| 81 | butyl | butyl | —NH(CH₂)₂—N(C₂H₅)₂ | NH₂—(CH₂)₂—N(C₂H₅)₂ | 74–75 |
| 82 | butyl | butyl | —NH—C₆H₄OCH₃(4) | NH₂—C₆H₄OCH₃(4) | 98–100 |
| 83 | benzyl | ethyl | —NH—C₆H₄—CH₃(4) | NH₂—C₆H₄—CH₃(4) | 135–136 |
| 84 | benzyl | ethyl | —NH—C₆H₄—OCH₃(3) | NH₂—C₆H₄—OCH₃(3) | 161–164 |
| 85 | benzyl | ethyl | —NH—C₆H₄—Cl(3) | NH₂—C₆H₄—Cl(3) | 204–207 |
| 86 | benzyl | ethyl | —O(CH₂)₂—N(C₂H₅)₂ | HO—(CH₂)₂—N(C₂H₅)₂ | 220—230/0.5 |
| 87 | benzyl | ethyl | —NH—C₆H₄—Cl(4) | NH₂—C₆H₄—Cl(4) | 176–179 (β-isomer) |
| 88 | benzyl | ethyl | —NH—C₆H₄—Cl(4) | NH₂—C₆H₄—Cl(4) | 198–200 (α-isomer) |
| 89 | benzyl | ethyl | —N(CH₂—CH₂)₂O | HN(CH₂—CH₂)₂O | 135–137 |

EXAMPLE 90:

2-Benzyl-3-ethyl-6,7,8,8a-tetrahydro-1(2H),4(3H)-dioxopyrrolo[1,2-a]pyrazine-6-methanol A mixture of 2-benzyl-3-ethyl-6,7,8,8a-tetrahydro-(2H),4(3H)-dioxopyrrolo[1,2-a]pyrazine-6-carboxylic acid (6.7 g.), 10 ml. of SOCl₂ and two drops of dimethylformamide in 100 ml. of chloroform is allowed to stand overnight. The solvent is evaporated in vacuo and the oily residue is dissolved in dioxane (50 ml.). To the resulting solution of the acid chloride, 5 g. of sodium borohydride in 100 ml. of dioxane is added and the solution is refluxed for 3 hours. Water (15 ml.) is added to the reaction mixture which is stirred for 30 minutes, then extracted several times with diethyl ether. Evaporation of the ether extracts gives 7.8 g. of the title product which is purified by distillation at 220°–230°C./0.5 mm Hg., m.p. 93°–95°C.

EXAMPLE 91:

3-Methyl-2-(p-tolyl)-6,7,8,8a-tetrahydro-1(2H),-4(3H)-dioxopyrrolo[1,2-a]pyrazine-6-methanol The title compound is obtained from the corresponding 6-carboxylic acid by following the same procedure as in the previous example; m.p. 122°–124°C.

EXAMPLE 92:

2-Benzyl-3-ethyl-6,7,8,8a-tetrahydro-1(2H),-4(3H)-dioxopyrrolo[1,2-a]pyrazine-6-methanol acetate To 4.1 g. of 2-benzyl-3-ethyl-6,7,8,8a-tetrahydro-1(2H),4(3H)-dioxopyrrolo[1,2-a]pyrazine-6-methanol and 7 g. of triethylamine in 50 ml. of benzene, a solution of 3.8 g. of acetyl chloride in 10 ml. of benzene is added at 10°–15°C. After refluxing for 3 hours and filtering off the by-product triethylamine hydrochloride, the solvent is evaporated and the oily residue is purified by chromatographing through a silica gel column and eluting with benzene:acetone 95:5 and distilled at 230°C./0.6 mm Hg., yield 2 g. of titular product.

EXAMPLE 93:

3-Methyl-2-(p-tolyl)-6,7,8,8a-tetrahydro-1(2H),-4(3H)-dioxopyrrolo[1,2-a]pyrazine-6-methanol acetate The title compound is prepared from the corresponding 6-carboxylic acid by following the procedure of the previous example, m.p. 126°–128°C.

EXAMPLE 94:

2-Benzyl-3-ethyl-6,7,8,8a-tetrahydro-1(2H),-4(3H)-dioxopyrrolo[1,2-a]pyrazine-6-acetic acid ethyl ester Ten grams of 2-benzyl-3-ethyl-6,7,8,8a-tetrahydro-(2H),4(3H)-dioxopyrrolo[1,2-a]pyrazine-6-carboxylic acid is transformed into the corresponding carbonyl chloride pursuant to the procedure described in the first part of Example 90, then it is dissolved in 60 ml. of dichloromethane and 90 ml. of anhydrous diethyl ether. To this solution, a diethyl ether solution containing 2.5% of diazomethane is added dropwise at about 0°C. until a persistent yellow color develops. The resulting mixture is stirred for one hour, then is allowed to stand overnight in a refrigerator. Evaporation of the solvent gives 13 g. of an oily residue which is dissolved in 100 ml. of dry ethanol. To this solution, 3 g. of silver benzoate in 27 ml. of triethylamine is added successively in three portions and the mixture is refluxed for 2 hours. After cooling, the reaction mixture is filtered and the filtrate is evaporated to dryness. The residue is dissolved in chloroform, washed with aqueous sodium carbonate and water. The solvent is then evaporated and the residue is purified by distilling at 240°–245°C./0.6 mm Hg, to give the titular product.

EXAMPLE 95 and 96:

By starting with the respective 6-carboxylic acids and proceeding as in Example 94, the following compounds are prepared:
95. 2-Benzyl-3-butyl-6,7,8,8a-tetrahydro-1(2H),4(3H)-dioxopyrrolo[1,2-a]pyrazine-6-acetic acid ethyl ester, m.p. 220°–230°C./0.6 mm Hg.
96. 3-Butyl-2-(3,4-dimethylbenzyl)-6,7,8,8a-tetrahy-(2H),4(3H)-dioxopyrrolo[1,2-a]pyrazine-6-acetic acid ethyl ester, m.p. 240°–250°C./0.6 mm Hg.

EXAMPLE 97:

3-Methyl-2-(p-tolyl)-6,7,8,8a-tetrahydro-1(2H),-4(3H)-dioxopyrrolo[1,2-a]pyrazine-6-methanol carbamate To 4 grams of 3-methyl-2-(p-tolyl)-6,7,8,8a-tetrahy-1(2H),4(3H)-dioxapyrrolo[1,2-a]pyrazine-6-methanol in 25 ml. of trichloroethylene a solution of 1.8 g. of phosgene in 50 ml. of trichloroethylene is added at 0°–2°C. The mixture is then refluxed for 2 hours and dry ammonia is then bubbled into the reaction vessel. The product which precipitates is washed with water and crystallized from ethanol, yield 3.8 g. of titular product, m.p. 174°–176°C.

EXAMPLE 98:

1-(2-Bromopropionyl)-5-(p-tolylcarbamyl)pyrrolidine-2-carboxylic acid ethyl ester To a solution of 45.3 g. of 5-(p-tolylcarbamyl)-pyrrolidine-2-carboxylic acid ethyl ester and 19.7 g. of triethylamine in 750 ml. of diethyl ether , 31 g. of 2-bromopropionyl chloride in 60 ml. of diethyl ether is added at 0°–5°C. The mixture is then refluxed for 1 hour and, after cooling, is washed successively with water, dilute HCl and again with water. Evaporation of the organic layer gives 26 g. of the titular product, melting at 114°–116°C. By operating according to the procedure of this example, the following compounds are prepared:

1-(2-Bromohexanoyl)-5-butylcarbamyl-pyrrolidine-2-carboxylic acid ethyl ester (oily). 5-Benzylcarbamyl-1-(2-bromobutyryl)-pyrrolidine-2-carboxylic acid ethyl ester, m.p. 85°–87°C.

By using 2,5-(dicarbethoxy)pyrrolidine and an indicated 2-bromoalkanoyl chloride as the starting compounds and by operating essentially as described above, the following 2,5-dicarbethoxypyrrolidine derivatives are obtained: 1-(2-bromoacetyl)-2,5-dicarbethoxypyrrolidine 1-(2-bromopropinoyl)-2,5-dicarbethoxypyrrolidine (oily) 1-(2-bromobutyryl)-2,5-dicarbethoxypyrrolidine (oily)

1-(2-bromo-3-methylbutyryl)-2,5-dicarbethoxypyrrolidine (oily)

1-(2-bromo-hexanoyl)-2,5-dicarbethoxypyrrolidine (oily)

1-(2-bromo-4-methyl-valeryl)-2,5-dicarbethoxypyrrolidine (oily).

2,5-Dicarbethoxypyrrolidine and the esters of 5-carbamylpyrrolidine-2-carboxylic acids are prepared according to the methods described by Cignarella et al. in J. Org. Chem. 26, 1500, (1961) and by cignarella et al. in Gazzetta Chimica Italiana 92, 1093, (1962).

The depressant activity of the inventive compounds on the central nervous system, C.N.S. activity, is evidenced by testing the compounds in mice according to the Irwin method. The tranquilizing and anxiolytic activity is evaluated on the basis of the secondary conditioned response in rats. The sedative activity is also evidenced in cats, dogs and monkeys. The effective dosage of representative compounds tested in animals ranges from about 10 mg./kg. to about 200 mg/kg. i.p. The toxicity of the new compounds is very low. Representative of such activity, the compound 3-methyl-2-(p-tolyl)-6,7,8,8a-tetrahydro-1(2H),4(3H)-dioxapyrrolo [1,2-a]pyrazine-6-carboxylic acid ethyl ester (α-isomer) showed the following $ED_{50}$ values for the following parameters of the Irwin test which are related to a sedative and hypnotic effect:

| Parameters | $ED_{50}$ in mice |
| --- | --- |
| Righting reflex | 30 mg./kg. i.p. |
| Impairment of motor coordination | 60 mg./kg. i.p. |
| Spontaneous activity | 60 mg./kg. i.p. |
| Minimal hypnotic dose | 200 mg/kg. i.p. |

The $LD_{50}$ value of the representative compound is about 800 mg./kg. i.p. in mice.

The compound 3-methyl-2-(p-tolyl)-6,7,8,8a-tetrahydro-(2H),4(3H)-dioxapyrrolo[1,2-a]pyrazine-6-carboxylic acid (α-isomer) when administered to conditioned rats at a dose of 60 mg/kg i.p. inhibits the secondary conditioned response in 7 out of 10 animals. The same does level does not affect the unconditioned response and the primary conditioned response. These characteristics indicate that the compound has anxiolytic and tranquilizing properties. Its $LD_{50}$ is higher than 1000 mg/kg i.p. in mice.

What is claimed is:

1. A compound represented by the formula

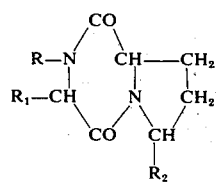

wherein R represents hydrogen, lower alkyl, phenyl, substituted phenyl having up to 2 substituents selected from lower alkyl, lower alkoxy, fluoro, chloro and bromo, benzyl or substituted benzyl having up to 2 substituents selected from lower alkyl, lower alkoxy, fluoro, chloro, and bromo; $R_1$ represents hydrogen or lower alkyl; $R_2$ represents (a) $COR_3$ wherein $R_3$ is selected from the group consisting of hydroxy, lower alkoxy, mono- and di-lower alkylamino-lower alkoxy, amino mono- and di-lower alkylamino, mono- and di-lower alkylamino-lower alkylamino, phenylamino, substituted phenylamino wherein substituted phenyl is as defined above, hydroxyamino and morpholino, pyrrolidino, piperidino and piperazino which said hetero groups may be substituted with up to 2 lower alkyl groups or (b) $CH_2R_4$ wherein $R_4$ is selected from hydroxy, carboxy, carbo(lower alkoxy), 1 to 4 carbon alkanoyloxy and carbamyloxy.

2. A compound as claimed in claim 1 wherein R represents phenyl, substituted phenyl, benzyl or substituted benzyl, having the said substituents as defined, $R_1$ represents hydrogen or lower alkyl, and $R_2$ represents —$COR_3$ wherein $R_3$ represents hydroxy or lower alkoxy.

3. A compound as claimed in claim 2 which is 3-methyl-2-(p-tolyl)-6,7,8,8a-tetrahydro-1(2H),4(3H)-dioxopyrrolo[1,2-a]pyrazine-6-carboxylic acid (alpha-isomer) or its ethyl ester.

* * * * *

Page 1 of 3

UNITED STATES PATENT AND TRADEMARK OFFICE
CERTIFICATE OF CORRECTION

PATENT NO. : 3,920,660
DATED : November 18, 1975
INVENTOR(S) : Luigi Fontanella; Luigi Mariani It is certified that error appears in the above-identified patent and that said Letters Patent are hereby corrected as shown below:

Column 5, line 39, at the end of the line, "tetrahydro-" should read --tetrahydro-1--;

Column 6, line 11, at the end of the line, "tetrahydro-" should read --tetrahydro-1--;

Column 6, line 24, at the end of the line, "tetrahydro-" should read --tetrahydro-1--;

Column 6, line 37, "EXAMPLES 8-35" should be set off as a new paragraph heading;

Columns 5 and 6, in the Table, fourth heading, first line, "6,7,8,8a-tetrahydro-" should read -- -6,7,8,8a-tetrahydro- --;

Columns 5 and 6, in the Table, fourth heading, second line, "1(2H),4(3H)-dioxopyr-" should read -- -1(2H),4(3H)-dioxopyr- --;

Columns 5 and 6, in the Table, under the fourth heading, Ex. No. 10, "3-butyl-3-(p-chlorobenzyl)-" should read --3-butyl-2-(p-chlorobenzyl)- --;

Columns 5 and 6, in the Table, under the fourth heading, Ex. No. 23, "3-ethyl-3-(3,4-dimethylbenzyl)-" should read --3-ethyl-2-(3,4-dimethylbenzyl)- --;

Columns 5 and 6, in the Table, fifth heading, line 3, "B.P. C./mm Hg." should read --B.P. °C./mm Hg.--;

Columns 7 and 8, in the Table continued, fourth heading, line 1 "6,7,8,8a-tetrahydro-" should read -- -6,7,8,8a-

UNITED STATES PATENT AND TRADEMARK OFFICE
CERTIFICATE OF CORRECTION

PATENT NO. : 3,920,660
DATED : November 18, 1975
INVENTOR(S) : Luigi Fontanella; Luigi Mariani It is certified that error appears in the above-identified patent and that said Letters Patent are hereby corrected as shown below:

tetrahydro- --;

Columns 7 and 8, in the Table continued, fourth heading, line 2, "1(2H),4(3H)-dioxopyr-" should read -- -1(2H),4(3H)-dioxopyr- --;

Columns 7 and 8, in the Table continued, fifth heading, line 3, "B.P. C./mm Hg." should read --B.P. °C./mm Hg.--;

Column 7, Example 38, line 38, "3-Methyl-6,7,8,8a-tetrahydro-Ob 1(2H),4(3H)-" should read --3-Methyl-6,7,8,8a-tetrahydro-1(2H),4(3H)- --;

Column 8, Example 50, line 25 "rahydro-" should read --rahydro-1--;

Column 8, Example 51, line 28, at the end of the line, "tetrahydro-" should read --tetrahydro-1--;

Column 8, Example 56, line 47, before "(2H)" insert --dro-1--;

Column 9, Example 68, line 19, "3-Methyl-2-(o-toly)-6,7,8,8a-tetrahydro-" should read --3-Methyl-2-(o-tolyl)-6,7,8,8a-tetrahydro- --;

Column 9, Example 73, line 2, before "(2H)" insert --dro-1--;

Column 10, line 14, "tetrahydro-" should read --tetrahydro-1--;

Column 10, line 33, the formula should read as follows:

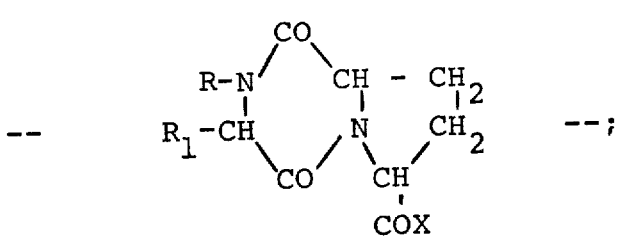

UNITED STATES PATENT AND TRADEMARK OFFICE
CERTIFICATE OF CORRECTION

PATENT NO. : 3,920,660
DATED : November 18, 1975
INVENTOR(S) : Luigi Fontanella; Luigi Mariani It is certified that error appears in the above-identified patent and that said Letters Patent are hereby corrected as shown below:

Column 10, first line under the heading of Example 90, at the end of the line "tetrahydro-" should read --tetrahydro-1--;

Column 11, line 37, at the end of the line, "tetrahydro-" should read --tetrahydro-1--;

Column 11, line 60, "EXAMPLE 95 and 96:" should read --EXAMPLES 95 and 96:--;

Column 12, line 1, before "(2H)" insert --dro-1--;

Column 12, line 10, before "1(2H)" insert --dro- --;

Column 12, line 42, "1-(2-bromopropinoyl)-2,5-dicarbethoxypyrrolidine (oily)" should read --1-(2-bromopropionyl)-2,5-dicarbethoxypyrrolidine (oily)-- and also should be set off as a new paragraph;

Column 12, line 43, "1-(2-bromobutyryl)-2,5-dicarbethoxypyrrolidine (oily)" should be set off as a new paragraph;

Column 12, line 54, "cignarella" should read --Cignarella--;

Column 13, line 14, "rahydro-" should read --rahydro-1--;

Column 13, line 18, "does" should read --dose--;

Column 14, line 10, "amino" should read --amino,--.

Signed and Sealed this

Twentieth Day of July 1976

[SEAL]

Attest:

RUTH C. MASON
*Attesting Officer*

C. MARSHALL DANN
*Commissioner of Patents and Trademarks*